May 14, 1957 W. R. HUBBARD 2,792,267
COLLAPSIBLE DESK TABLE FOR AUTOMOBILES
Filed Jan. 6, 1956 2 Sheets-Sheet 2
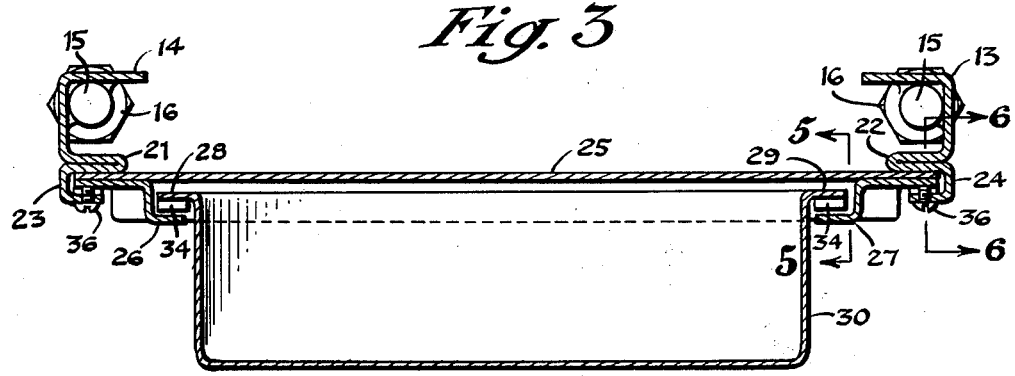
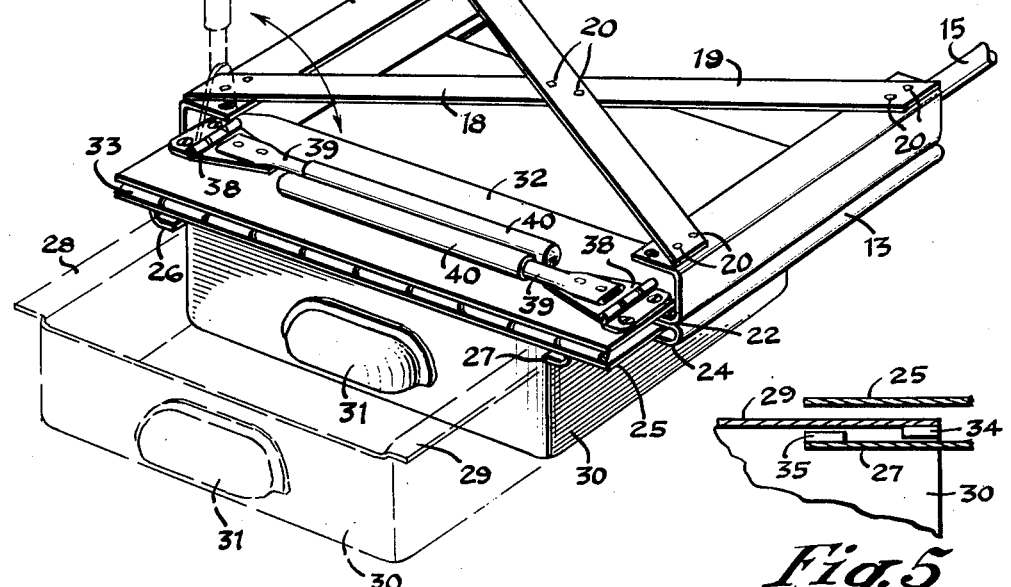
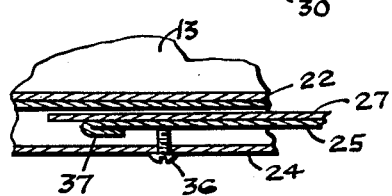
INVENTOR
WILLIAM R. HUBBARD
BY
Patrick D Beavers
ATTORNEY 2,792,267

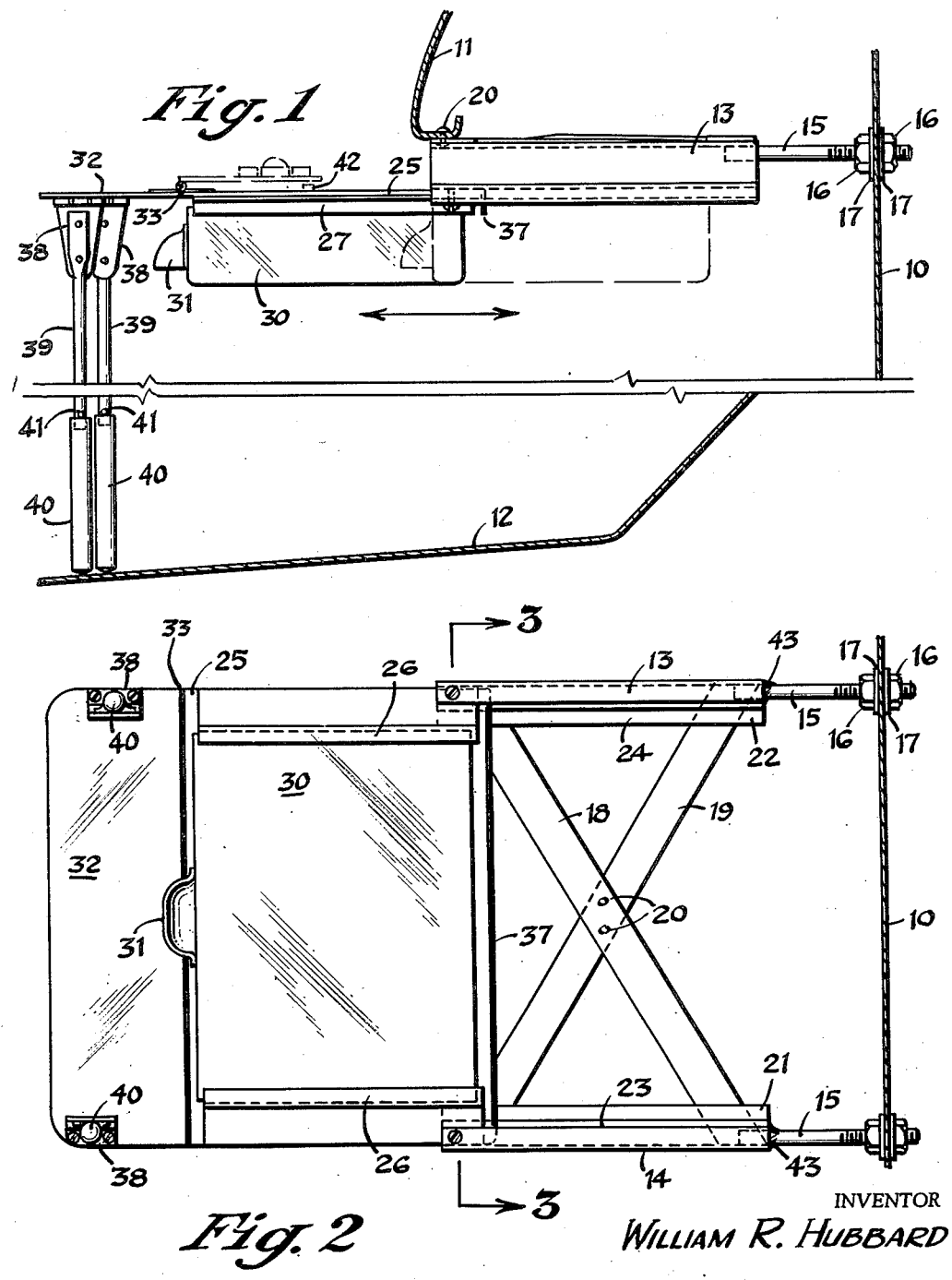

COLLAPSIBLE DESK TABLE FOR AUTOMOBILES

William R. Hubbard, Gretna, Va.

Application January 6, 1956, Serial No. 557,702

1 Claim. (Cl. 311—21)

This invention relates to improvements in automobile desk tables and more particularly to a structure that is attached to the dashboard and instrument panel of an automobile and so positioned that it may be moved outwardly of the instrument panel of the automobile so that it is accessible to an occupant of the automobile so that it may be used as a desk or table.

An object of this invention is to provide a desk table that is provided with a pair of double tracks that are connected at one end to the dashboard of an automobile and at the opposite end to the lower surface of the instrument panel and the desk table mounted in the tracks so that it can be moved outwardly of the instrument panel into operative position or slid under the instrument panel into inoperative position.

Another object of the invention is to provide a two leaf folding desk table having a plurality of supports connected to the undersurface of one of the leaves that will support the leaf so that it will be steady for the efficient use thereof.

A further object of the invention is to provide a two leaf folding desk table having a pair of double tracks mounted on the undersurface of one of the leaves and in which is slidably mounted a drawer.

The desk table, when in position, may be used as a table for meals, for supporting typewriters, adding machines and other miscellaneous items, the drawer serving to hold stationery, books and maps, etc.

With the above and other objects and advantages in view the invention consists of the novel details of construction, arrangement and combination of parts more fully hereinafter described, claimed and illustrated in the accompanying drawings in which:

Fig. 1 is a side elevational view, partly broken away, of a desk table embodying the invention as installed in an automobile shown in section;

Fig. 2 is a bottom plan view of the desk table of Fig. 1;

Fig. 3 is a transverse sectional view on the line 3—3 of Fig. 2;

Fig. 4 is a perspective view of the desk table;

Fig. 5 is a detailed fragmentary sectional view on the line 5—5 of Fig. 3; and

Fig. 6 is a detailed fragmentary sectional view on the line 6—6 of Fig. 3.

Referring more in detail to the drawings, wherein like parts are designated by like reference numerals, the reference numeral 10 is used to designate a portion of the dashboard of an automobile, a portion of the instrument panel 11 thereof and a portion of the floorboard 12 thereof.

A supporting structure for a desk table embodying the invention comprises a pair of double track members 13 and 14. A bolt 15 is secured to the rear end of each of the track members 13 and 14 and the bolts 15 are secured to the dashboard 10 in spaced relation to each other by nuts and washers 16 and 17.

Secured to the opposite ends of the upper surface of the members 13 and 14, in crossed relation to each other by rivets 20, is a pair of brace bars 18 and 19. At the portion of the bars 18 and 19 where they cross each other, the same are also secured to each other by additional rivets 20.

The members 13 and 14 are crimped upon themselves as at 21 and 22, respectively, Fig. 3, and L-shaped portions 23 and 24 are formed as continuations of the crimped portions 21 and 22.

It has been pointed out that the bolts 15 are secured to the dashboard 10 and in Fig. 1 it will be noted that the members 13 and 14 are also secured at their forward ends to the undersurface of the instrument panel 11 by certain of the rivets 20.

A table leaf 25 is provided with a pair of spaced parallel disposed angle iron tracks 26 and 27 in which is slidably mounted the side flanges 28 and 29, respectively, of a drawer 30. The drawer 30 is provided with a drawer pull 31, whereby the drawer 30 may be moved into open or closed position with relation to the leaf 25. A second leaf 32 is connected at one longitudinal edge thereof to the forward longitudinal edge of the leaf 25 by a piano hinge 33.

Viewing Fig. 5, it will be noted that a stop 34 is secured to the rear edge of each of the flanges 28 and 29 and a stop 35 for coaction with the stop 34 is secured to each forward edge of the tracks 26 and 27. The stops 34 and 35 prevent the drawer 30 from being pulled outwardly of the tracks 26 and 27. Stops 43 are also provided at the rear ends of the portions 23 and 24 to prevent the drawer 30 from being pushed inwardly too far into the portions 23 and 24.

Stops comprising adjustable bolts 36 are threaded into each of the L-shaped portions 23 and 24, Fig. 6, which engage an inwardly rolled edge 37 of the leaf 25. The rolled edge 37 also functions as a stop for the rear of the drawer 30 so that it cannot be pushed too far within the members 13 and 14.

Secured to the undersurface of the leaf 32 adjacent each side edge thereof is a hinge 38 and a fixed tubular portion 39 is fixed to each of the hinges 38. Telescopically mounted on each of the portions 39 is a tubular portion 40 and the portions 39 and 40 form adjustable legs for supporting the leaf 32 in horizontal contiguous relation to the leaf 25.

Spring biased dogs 41 are mounted in each of the portions 39. When the portions 40 are extended beyond the dogs 41, the dogs 41 will retain the portions 40 in extended relation to the portions 39, as shown in Fig. 1.

When not in use the legs are collapsed and positioned on the undersurface of the leaf 32 and the leaves 25 and 32 are slid inwardly into the members 13 and 14, as shown in dotted lines in Fig. 1. Projections 42 are positioned on the leaf 25 so that the corners of the leaf 32 will rest thereon, as in Fig. 1. The projections raise the leaf 32 so that when the drawer is moved inwardly, as in Fig. 4, the leaf 32 will slide in the members 13 and 14 above the crimped portions 21 and 22. The projections 42 are positioned on the leaf 25 so that they will not engage the crimped portions 21 and 22 as the drawer 30 is moved inwardly.

In operative position the leaves 25 and 32 are extended outwardly of the instrument panel 11, as shown in Fig. 1.

To keep the assembly from rattling, the portions 23 and 24, and the angle irons 26 and 27 may be lined with felt. Thus, the leaf 25 and drawer 30 will slide on felt for silence and easy manipulation.

In use the desk table is in the position of Fig. 1. When not in use the assembly is in the position of Fig. 4, under the instrument panel 11 of the automobile.

The drawer 30 will hold a plurality of items that may be necessary to the occupant of the automobile. The two leaves 25 and 32 will provide a working surface as well as a surface on which meals may be eaten.

It is believed that from the foregoing descripiton, the construction and operation of the desk table will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

In a device of the character described, the provision of a slidable leaf, an outwardly foldable extension for said leaf, and a leg member hinged to each side portion of the underside of said extension whereby said leg members may be folded transversely of said extension, said legs each comprising an outer portion and an inner portion telescopically received in said outer portion, and a spring biased dog mounted in each of the inner portions and adapted to bear against the adjacent edge of the outer portion when the leg member is extended.

References Cited in the file of this patent
UNITED STATES PATENTS

| | | |
|---|---|---|
| 2,249,845 | Mitchell | July 22, 1941 |
| 2,270,557 | Randall | Jan. 20, 1942 |
| 2,275,060 | Griffin | Mar. 3, 1942 |
| 2,292,797 | Roberts | Aug. 11, 1942 |
| 2,530,876 | Harris | Nov. 21, 1950 |
| 2,556,724 | Hubsch | June 12, 1951 |
| 2,616,775 | Nesbitt et al. | Nov. 4, 1952 |
| 2,657,967 | Gilchrist | Nov. 3, 1953 |
| 2,672,385 | Segal | Mar. 18, 1954 |
| 2,688,524 | Hodgman | Sept. 7, 1954 |